United States Patent [19]

Alten

[11] Patent Number: 4,727,613
[45] Date of Patent: Mar. 1, 1988

[54] DOCK LEVELER

[76] Inventor: Kurt Alten, Ringstrasse 14, D-3015 Wenningsen, Fed. Rep. of Germany

[21] Appl. No.: 943,646

[22] Filed: Dec. 17, 1986

[30] Foreign Application Priority Data

Dec. 17, 1985 [DE] Fed. Rep. of Germany ....... 3544545

[51] Int. Cl.⁴ .............................................. E01D 1/00
[52] U.S. Cl. ...................................... 14/71.1; 14/71.3; 14/71.7
[58] Field of Search .................... 14/69.5, 71.1, 71.3; 49/33

[56] References Cited

U.S. PATENT DOCUMENTS

| | | | |
|---|---|---|---|
| 937,375 | 10/1909 | Logan | 14/71.1 X |
| 2,489,869 | 11/1949 | Dunn | 14/71.1 X |
| 2,972,762 | 2/1961 | McConica | 14/71.3 |
| 2,994,894 | 8/1961 | Loomis et al. | 14/71.3 |
| 4,010,571 | 3/1977 | McGuire et al. | 49/33 X |
| 4,382,307 | 5/1983 | Alten | 14/71.1 X |
| 4,488,325 | 12/1984 | Bennett et al. | 14/71.3 |
| 4,510,638 | 4/1985 | Alten | 14/71.1 X |

Primary Examiner—James A. Leppink
Assistant Examiner—Matthew Smith
Attorney, Agent, or Firm—Becker & Becker, Inc.

[57] ABSTRACT

A dock leveler that includes a pivotable bridge plate and an extension that can be moved back and forth relative to the latter and serves for reseting the bridge plate on a platform that is to be loaded or unloaded. A switch is provided that effects or permits automatic return of the dock leveler into the neutral or rest position. To ensure that return to the neutral position reliably occurs only when no platform is in the vicinity of the dock leveler, there is provided below the tip of the extension a sensing element that is movable in the direction toward the bridge plate and that can be contacted by the platform. The sensing element activates the switch except when the platform contacts the sensing element, at which time the switch is deactivated.

10 Claims, 4 Drawing Figures

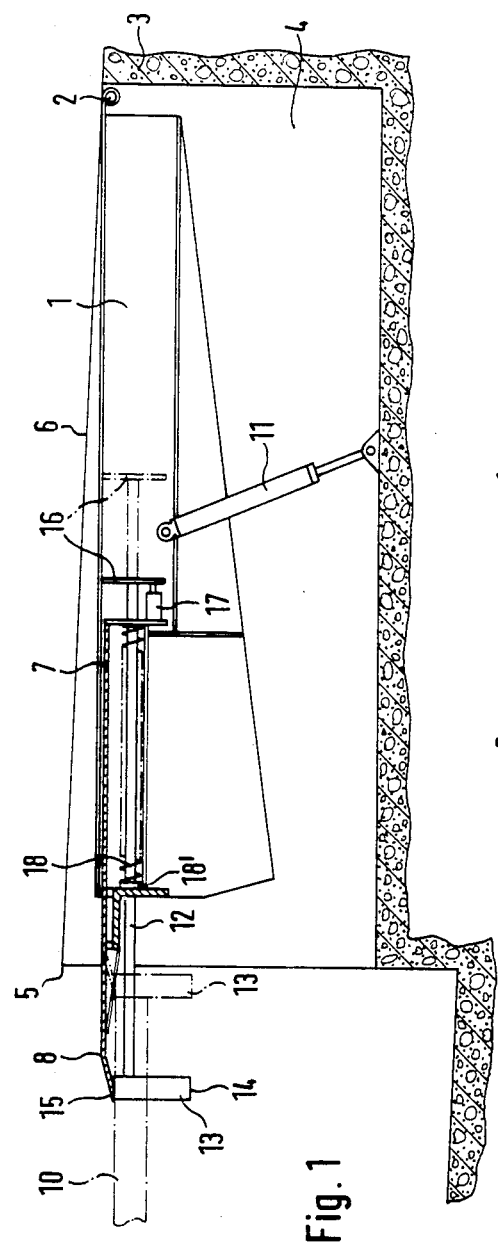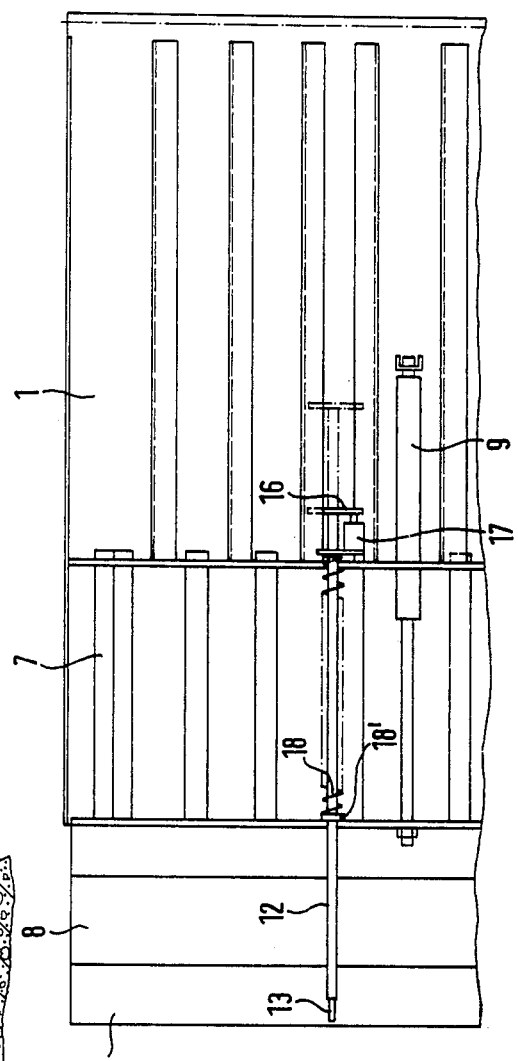

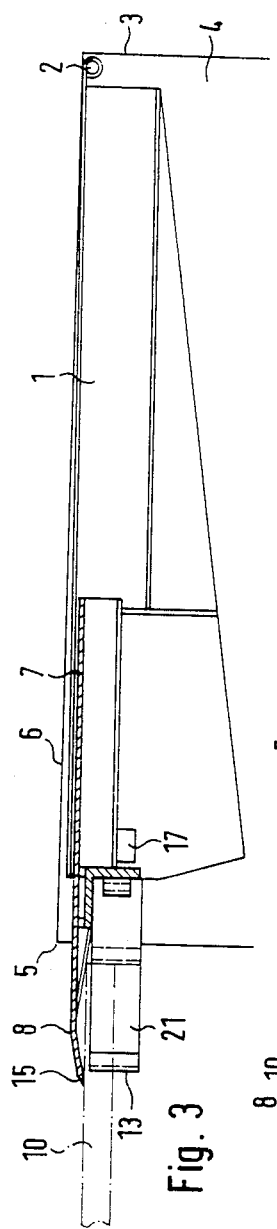
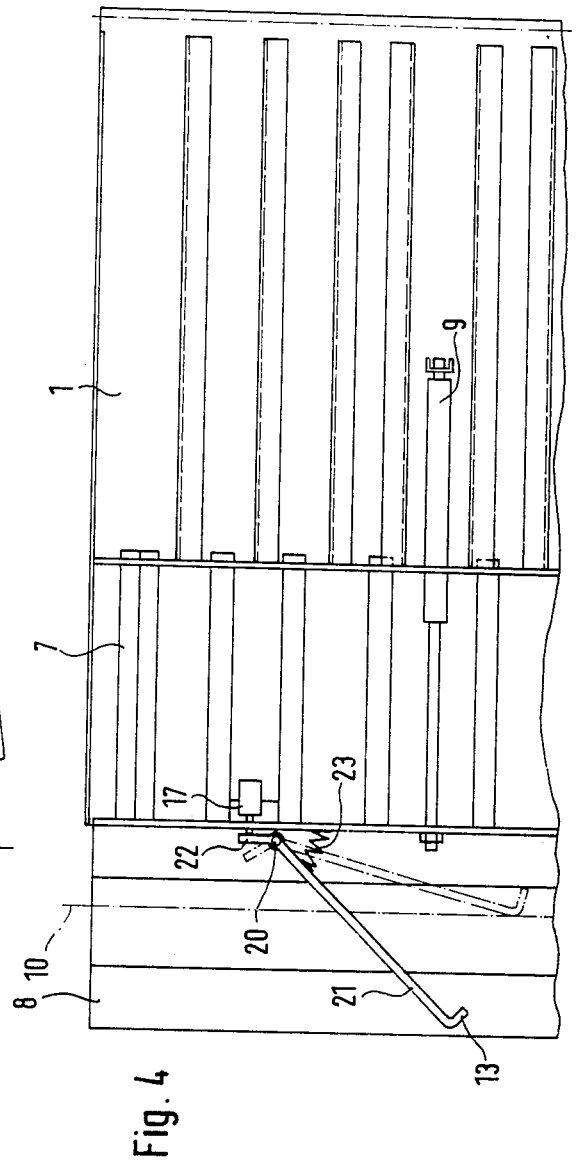
Fig. 3
Fig. 4

DOCK LEVELER

BACKGROUND OF THE INVENTION

1. Field of the Invention

The present invention relates to a dock leveler for ramp-bridging apparatus that includes a bridge plate, the dock-end of which is pivotably mounted about a horizontal axis, and an extensible and retractable extension that is disposed at the free end of the bridge plate and that serves for placement and support on a platform that is to be loaded or unloaded. The dock leveler also has a switch that effects or permits an automatic return into the rest position of the dock leveler.

2. Description of the Priot Art

Difficulties arise with such dock levelers if the vehicle that is to be loaded or unloaded is still in the dock region, but for some reason is no longer in connection with the extension of the bridge plate, i.e. no longer contacts the latter. This can occur, for example, when the bridge plate has already assumed its lower end position, where it rests against an abutment, but at the same time the platform of the vehicle has sunk even further, perhaps because a load-carrying device has been driven thereon. Under these conditions, a gap is formed between the extension and the platform. As a result, accidents can occur, especially since the dock leveler can then retract into the neutral position.

An object of the present invention is to improve dock levelers of the aforementioned general type in such a way that an undesired retraction into the so-called neutral position cannot occur even when a gap exists between the extension and the platform.

BRIEF DESCRIPTION OF THE DRAWINGS

This object, and other objects and advantages of the present invention, will appear more clearly from the following specification in conjunction with the accompanying schematic drawings, in which:

FIG. 1 is a vertical cross-sectional view through one exemplary embodiment of the inventive dock leveler;

FIG. 2 is a partial bottom view of the dock leveler of FIG. 1;

FIG. 3 is a vertical cross-sectional view of another exemplary embodiment of the inventive dock eveler; and FIG. 4 is a partial bottom view of the dock leveler of FIG. 3.

SUMMARY OF THE INVENTION

The dock leveler of the present invention comprises: a bridge plate having a first end pivotably mounted on a dock in such a way as to be pivotable about a horizontal axis; and extension that is movably mounted on an opposite second end of the bridge plate in such a way as to be extensible from the bridge plate into an operative position, and in such a way as to be retractable into a rest position of the dock leveler with the extension, in an operative position, serving for support of the bridge plate on a platform that is to be loaded or unloaded, said extension having a tip remote from the first end of the bridge plate; switch means for triggering automatic return of the dock leveler to the rest position in the absence of a platform; switch-controlling means, for example in the form of a rod or double lever, movably connected to the extension in such a way as to be movable toward and away from the bridge plate and the switch means; and a sensing element connected to the switch-controlling means and disposed approximately below the tip of the extension in the operative position of the latter prior to placement of the dock leveler on the platform, whereby the sensing element is adapted to be contacted by the platform, with the switch-controlling means contacting the switch means, for said triggering action, when the sensing element is not in contact with the platform, and with the switch-controlling means releasing the switch means, for termination of said triggring action, when the sensing element is contacted by the platform.

As indicated, the movable mounting of the sensing element can be effected by a rod-like member that is movable in the longitudinal direction of the dock leveler, or by a lever that is pivotable about a vertical or a horizontal axis. The sensing element is disposed at the front end of the rod-like member, or at the free end of the lever, in such a way that it can be reliably contacted by the vehicle or the platform thereof; if desired, the sensing element could also come into contact with the platform by extending the extension. The rod-like member, or the lever, act either directly or indirectly on the switch, which can be any desired type of switch, such as an electrical switch or a hydraulic switch. It is to be understood that the rod-like member or the lever must be under the effect of a return force in such a way that when the sensing element is not contacted, the switch is actuated so as to enable return of the bridge plate into the so-called neutral position.

However, if the sensing element is contacted, and hence the switch is released, the bridge plate cannot return to the neutral position. This assures that return to the neutral position is always precluded if the platform is still in the effective range of the extension of the bridge plate.

The sensing element is advantageously provided with special dimensions, especially with regard to its height, so that it can accommodate a wide range of vehicle platform height deviations that might occur after the bridge plate, i.e. the extension thereof, is placed on the platform. For example, the sensing element can be dimensioned in such a way that its upper end is disposed just below the extension, with the sensing element itself extending downwardly a considerable extent, for example approximately 20–30 cm. Pursuant to one advantageous inventive embodiment, this downward extension of the sensing element corresponds to approximately 0.3–0.5 times the length of the extension of the bridge plate. The downward extension of the sensing element has the great advantage that the latter can affect the switch, i.e. is displaceable to thereby release the switch, even when the bridge plate is already in its lower end position, where it rests upon a fixed abutment.

The present invention is advantageously used with such dock levelers which, from every position of its bridge plate, can be moved into the so-called neutral position, either by automatically operating means or by manual control. In particular, however, the inventive dock leveler has application where automatic return into the so-called neutral position occurs when the vehicle platform leaves the dock or the region of the dock leveler.

Further specific features of the present invention will be described in detail subsequently.

DESCRIPTION OF PREFERRED EMBODIMENTS

Referring now to the drawings in detail, the dock-end of the bridge plate 1 is pivotably disposed, about a transverse shaft or axis 2, on the dock 3, which has a recess 4, a dock edge 5, and a dock surface 6.

Disposed at the front or free end of the bridge plate 1 is an extension 8 that can be moved back and forth in the longitudinal direction of the apparatus via carriages 7. The extension 8 can be moved by a cylinder 9, and serves to support the bridge plate 1 on a platform 10 of a vehicle that is to be loaded or unloaded, with such support being provided when the dock leveler is in operation and a changing height of the platform 10 involves a matching movement of the bridge plate 1. This can occur as a result of different load conditions and load-carrying devices on the vehicle. Since it is advantageous to have the extension 8 constantly in contact with the platform 10, the bridge plate 1 is made so as to be slightly front-heavy.

A hydraulic lifting cylinder 11 serves for raising the bridge plate 1. The feed lines and pressurizing mechanisms for the cylinders 9 and 11 are not illustrated.

The inventive dock leveler is also provided with a special control mechanism, which is basically known, as well as with a switchboard. These devices are embodied in a conventional manner, and are not illustrated.

In the exemplary embodiment of FIGS. 1 and 2, a longitudinally movable rod 12 is mounted on the carriage 7, which in the drawing is illustrated in the extended state. The free end of the rod 12 is provided with a sensing element 13 in the form of a vertically disposed sheet or plate 14. In the non-stressed or non-contact state, i.e. where the sensing element 13 does not contact, for example. the platform 10, the plate 14 is disposed below the tip 15 of the extension 8, with a slight clearance being provided between the upper edge of the plate 14 and the bottom of the extension 8; the plate 14 extends downwwardly by about 25 cm. At the back end of the rod 12, behind the carriage 7, the rod 12 is provided with a vertically disposed end plate 16 that in the non-contact state of the sensing element 13 actuates a switch 17 disposed at the rear end of the carriage 7. The rod 12 is held in this forward position by a compression spring 18 that is supported at the back on the carriage 7 and at the front on a projection 18′ of the rod 12 in such a way that the spring 18 constantly tries to urge the sensing element 13 below the tip 15, thus actuating the switch 17, or keeping in its effective position, via the end plate 16.

If, with the carriage 7 extended and hence the extension 8 projecting outwardly, the platform 10, in other words the vehicle, is backed up and contacts the sensing element 13, the latter is pushed back, thus moving the rod 12 to the back and releasing the end plate 16 from the switch 17. This terminates the operative position of the switch 17. Such a position is shown via dashed lines in FIG. 1, and the significance thereof will be described subsequently.

Also associated with the inventive dock leveler is a control mechanism, which assures that the apparatus returns to its normal position (neutral position) when the platform 10, i.e. the vehcile, leaves the dock. Under these conditions, for safety reasons, the surface of the bridge plate 1 must again be flush with the dock surface 6. Thus, firm support of the bridge plate 1 is necessary so that dock traffic can be carried out. At this point, the extension 8 along with the rod 12 and sensing element 13 are retracted.

The switch 17, in the form of an electrical switch or a hydraulic element, is operatively connected with the aforementioned control mechanism in such a way that automatic return to the neutral or initial position occurs only when the switch 17 is actuated by the end plate 16. This is the case only when no platform 10 is in the vicinity of the extension 8. This is necessary because if the dock leveler would return to the neutral position when this is not desired, i.e. when the platform 10 is still in the vicinity of the extension 8, an accident could occur. This danger results with the heretofore known dock levelers when, for example, the bridge plate 1 has reached its lowermost end position and the platform 10, for whatever reason, has sunk even further and contact has been broken with the extension. This results in a gap between the platform 10 and the extension 8, resulting in dangerous working conditions. With the inventive dock leveler, even under these circumstances an automatic return to the neutral position is prevented because the sensing element 13 still extends sufficiently downward to assure contact between the sensing element 13 an the platform 10.

In the embodiment illustrated in FIGS. 3 and 4, the aforementioned rod 12 is replaced by a double lever that is pivotable at the back end of the extension 8 about a vertical shaft or axis 20. The longer arm 21 of the double lever supports the sensing element 13 below the tip 15 of the extension 8. In contrast, the shorter arm 22 of the double lever is in a position to actuate the switch 17, which is always the case whent he arm 21 is in the position illustrated in FIG. 4, i.e. when no platform 10 has pivoted the double lever. A compression spring 23 is associated with the double lever, and urges the long arm 21 into its rest or neutral position. With this embodiment also, contact of the switch 17 occurs only when no vehicle is in the vicinity of the extension 8. In that case, automatic return into the aforementioned neutral position can be effected in an unimpaired manner. This measure is prevented by the switch 17 only in the situation where the sensing element 13 is contacted and the long arm 21 of the lever is pivoted. Again with this embodiment of FIGS. 3 and 4, the sensing element 13 is embodied in such a way that it can still be contacted when, for whatever reason, a considerable gap exists between the extension 8 and the platform 10, in which situation with the heretofore known dock levelers an automatic return of the latter into the neutral position occurs.

It is to be understood that the return of the dock leveler into the aforementioned neutral position is effected by control of the two cylinders 9, 11. This control could also be triggered from the switchboard by a push button. However, this control could also be carried out by a limit switch or some other means.

Furthermore, it is possible to have the return into the aforementioned neutral position be initiated altogether by the sensing element 13. Accordingly, control of the dock leveler can be such that automatic return is effected when the platform 10 is withdrawn and the sensing element 13 has passed below the tip 15, i.e. has assumed its rest position.

It should furthermore be noted that the compression spring 18 provided in the embodiment of FIGS. 1 and 2 could also be a tension spring with, for example, one end thereof being secured to the rod 12, for example on the free end thereof, and with the other end of the spring being secured to a transverse element of the extension 8. It would also be possible to provide springs on both sides of the rod 12.

The present invention is, of course, in no way restricted to the specific disclosure of the specification and drawings, but also encompasses any modifications within the scope of the appended claims.

What I claim is:

1. A dock leveler, comprising:

a bridge plate having a first end pivotably mounted on a dock in such a way as to be pivotable about a horizontal axis, said bridge plate also having a second end remote from said first end displaceable into a lower end position where it rests upon a fixed abutment location;

an extension movably mounted on said second end of said bridge plate in such a way as to be extensible from said bridge plate from an initial position into an operative position, and in such a way as to be retractable into a rest position of said dock leveler, with said extension, in said operative position, serving for support of said bridge plate on a platform of a vehicle that is to be loaded or unloaded; said extension has a tip remote from said first end of the bridge plate;

switch means for triggering return of said dock leveler to said rest position in the absence of a platform;

switch-controlling means movably connected to said extension in such a way as to be movable toward and away from said bridge plate and said switch means; and a sensing element that is connected to said switch-controlling means and that is disposed extending downwardly in a predetermined range for an effective extent approximately below said tip of said extension in the operative position of the latter and prior to placement of said extension on a platform; said sensing element is adapted to be contacted by a platform, said switch-controlling means engaging said switch means, when said sensing element is not in contact with said platform, and said switch-controlling means disengaging said switch means, when said sensing element is in contact with said platform, said switch means being operatively connected with said switch-controlling means so that for safety reasons to avoid any accidents an automatic return to initial-rest position occurs only when said switch means is actuated by said switch-controlling means that results only when no platform is in the vicinity of said extension.

2. A dock leveler according to claim 1, which includes carriage means movably connected to said bridge plate and supporting said extension, with said switch means being fixedly connected to said carriage means, and said switch-controlling means being movably mounted on said carriage means.

3. A dock leveler according to claim 2, in which said sensing element is in the form of a sheet having a first end disposed just below said extension, and a second end that extends downwardly from said first end thereof by an amount equal to approximately 0.3–0.5 times the length of said extension.

4. A dock leveler according to claim 3, in which said sheet extends downwardly by about 20–30 cm.

5. A dock leveler according to claim 3, in which said switch-controlling means comprises a rod-like member that is longitudinally movably mounted on said carriage means, with the latter including spring means that urges said rod-like member in a direction away from said first end of said bridge plate; said rod-like member has an end remote from said first end of said bridge plate, with said sensing element being disposed on said remote end of said rod-like member.

6. A dock leveler according to claim 5, in which said rod-like member has a further end that is opposite said remote end thereof and that is provided with a projection for effecting said contact and release of said switch means.

7. A dock leveler according to claim 6, in which said projection is in the form of a plate that extends at right angles to said rod-like member.

8. A dock leveler according to claim 1, in which said switch-controlling means comprises lever means that is pivotable about a vertical axis, with spring means acting on said lever means in such a way as to urge said sensing element in a direction away from said first end of said bridge plate; said lever means has a first end that carries said sensing element, and an opposite second end for effecting said contact and release of said switch means.

9. A dock leveler according to claim 8, in which said lever means is a two-armed lever, with said sensing element being disposed on one arm thereof, while the other arm effects said contact and release of said switch means.

10. A dock leveler according to claim 8, in which said extension has an end remote from said tip thereof, with said lever means being pivotably mounted to said extension in the vicinity of said remote end thereof.

* * * * *